July 10, 1951 M. KAHR ET AL 2,560,449
FREE PISTON ENGINE
Filed Jan. 2, 1947 3 Sheets-Sheet 1

INVENTORS
MARTIN KAHR
VINCENT R. NOLL
BY
John W. Michael
ATTORNEY

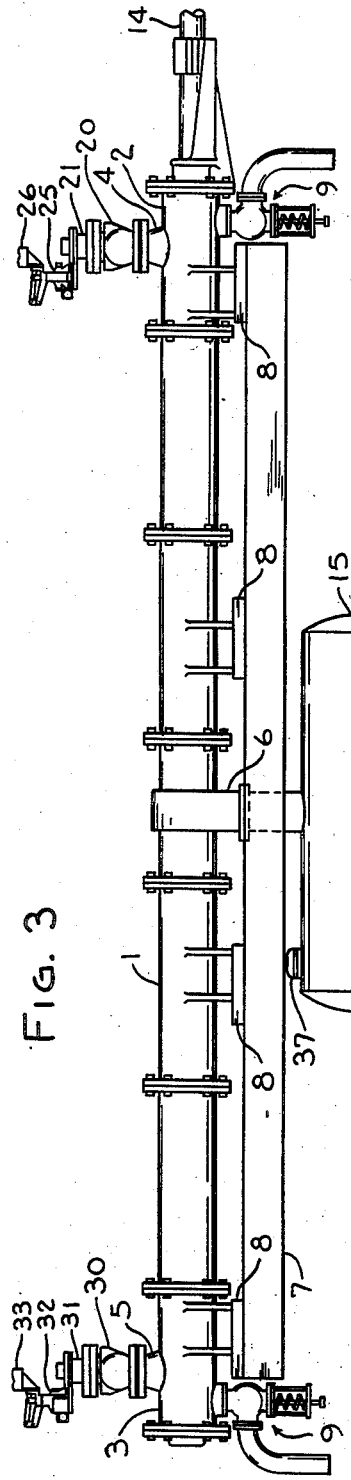

Patented July 10, 1951

2,560,449

UNITED STATES PATENT OFFICE 2,560,449

FREE PISTON ENGINE

Martin Kahr and Vincent R. Noll, Milwaukee, Wis., assignors to The Filer & Stowell Co., Milwaukee, Wis., a corporation of Wisconsin Application January 2, 1947, Serial No. 719,756

18 Claims. (Cl. 121—126)

This invention relates to improvements in engines, and particularly to engines of the type employing a free piston.

There are some types of devices which require for motivation reciprocally acting power. With the present type of crank shaft engine such power would have to be mechanically converted. Usually these types of devices require that the velocity of the motivating part during the greater portion of each reciprocal working stroke be substantially constant. This cannot be obtained by the present crank shaft engine.

It is therefore an object of this invention to provide a free piston engine in which the piston and piston rod have reciprocal movement without the necessity of using a crank shaft.

Another object of the invention is to provide a free piston engine in which the velocity of the piston and piston rod during the major portion of each stroke is maintained substantially uniform.

These objects are obtained by providing a long double-headed cylinder in which is mounted for reciprocation a piston having connected therewith a piston rod which extends from the cylinder. The piston rod is not connected with a crank shaft but is adapted for connection with any device which requires reciprocal motivating power for its operation. The cylinder has inlet ports adjacent each end and an exhaust port in the center. Feed valves control the admission of a compressible medium such as gas, vapors or mixtures thereof to the inlet ports. These valves are operated by the differential in pressure within the supply line and the cylinder. The application of this pressure differential is regulated by solenoid-operated pilot valves. The solenoids of these pilot valves are controlled by electronic timers and pressure switches. Steam, air, nitrogen or other compressible mediums from a source of constant pressure is admitted at one end to accelerate the piston. The momentum thus imparted to the piston and other reciprocating parts compresses the medium between the piston and the other end of the cylinder after the piston passes the exhaust port. During this compression the feed valve at that end remains closed. When the kinetic energy of such moving parts is absorbed in compressing the medium, the piston stops and reverses its travel. On the reverse stroke, the medium is admitted from such other end by the feed valve as the pressure in that end approaches the pressure in the supply line to aid in accelerating the piston and maintaining its velocity. A duplicate action then takes place at the first end. Thus a reciprocation of the piston and piston rod is obtained without the aid of a crank shaft. The velocity of the piston is controlled by the length of time that the medium is admitted. This length of time can be regulated by the adjustment of the electronic timers. The pressure due to the compression from momentum is greater than the pressure of the source of supply; hence, there is caused a rapid acceleration of the piston during the first stages of each stroke. Because of this the piston substantially reaches the required working velocity in a small fraction of the total stroke. By making the cylinder longer than the required working travel of the part to be reciprocated, such working travel may be accomplished at substantially constant velocity.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 3 is a view in side elevation of a steam engine embodying the invention, with parts shown in fragment, to illustrate the relative positioning of the component parts of the engine;

Fig. 4 is a view in top elevation of the steam engine viewed in Fig. 3;

Fig. 5 is a diagrammatic view of a hydraulic barking nozzle and its carriage illustrating one of the devices which the steam engine constructed in accordance with this invention is adapted to motivate.

Figure 2:
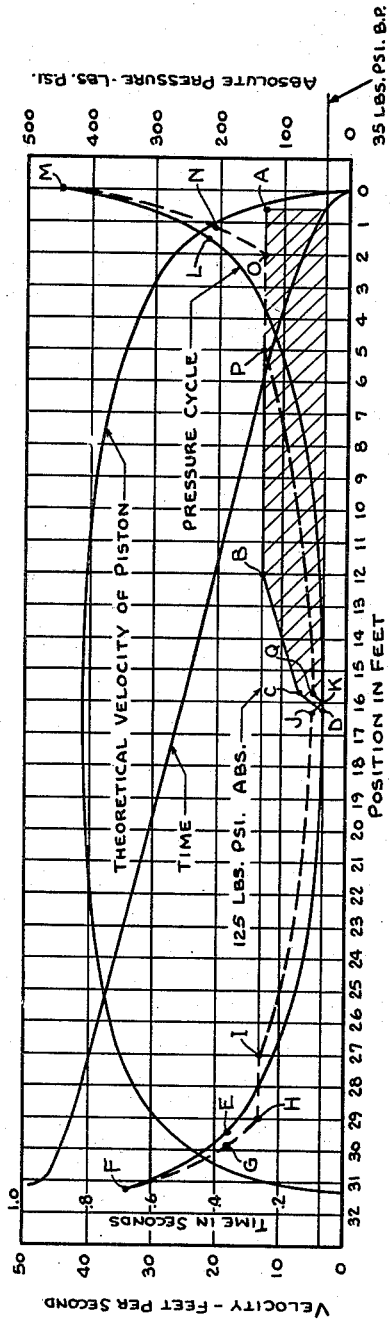
Fig. 2 is a view of a diagram or chart showing the pressure cycles and piston velocity plotted against piston position relative to its travel in the cylinder.

In the particular embodiment of the invention described herein the engine is designed for use with steam as the motivating compressible medium. If other compressible mediums are used the changes if necessary will be dimensional only in character.

Referring to the drawings by reference numerals, the steam engine comprises an elongated cylinder 1, a piston 13 and piston rod 14 reciprocally mounted therein, steam inlet ports 4 and 5 adjacent each end of the cylinder, and an exhaust port 6 located centrally of the cylinder. In addition to these main elements there are steam feed valves 20 and 30, which control the admission of steam from the supply 10 to each end of the cylinder, and other supplementary controls. With this type of steam engine there is no need for a crank shaft. The control of the stroke and the reversal of travel of the piston depends upon the compression of steam under the force of momentum. The steam engine thus has particular application to motivating devices which require for their operation a reciprocally acting power. For the sake of illustration there is diagrammatically shown in Fig. 5 a part of a hydraulic log barker. These barkers are used by lumber producing companies to remove the bark from logs prior to converting them into pulp. A rotating log is subjected to a stream of water under high pressure. The action of the water cuts the bark from the log. However, the nozzle must travel rapidly from end to end of the log. It is this reciprocal travel of the water nozzle which may be effected by the operation of the steam engine herein described.

The parts from which the steam engine is constructed and the construction of the steam feed valves and their motivating pistons, the pressure-operated valves, the solenoid-operated pilot valves, the pressure regulators and reducers, electrical relays, electronic timers, etc., are not described as they are standard elements well known to those skilled in the art of steam engineering and steam engines. The cylinder 1 is made of a plurality of sections joined together. Its length depends upon the required working travel of the device to be motivated. In this embodiment, its length is approximately thirty-three feet and its diameter is approximately twelve inches. The stroke, however, is only about thirty-one feet. The length may be varied by removing or adding standardized sections. The cylinder has a front end 2 and a back end 3 which contain respectively the inlet ports 4 and 5. These ends also incorporate pressure relief valves 9. The ends are constructed substantially the same except that the front end has a head provided with a standard stuffing box for the piston rod 14. The cylinder is mounted on a frame 7 by means of adjustable base plates 8 which permit lateral as well as vertical adjustment to properly aline the cylinder with the hydraulic barking carriage. Steam is supplied from a source of steam pressure at 125 pounds per square inch absolute (hereinafter abbreviated "lbs. p. s. i. abs."). Steam from this source is controlled by a manually operated main valve 11 from which it is supplied to the center of a manifold supply line 12 which connects with each of the inlet ports 4 and 5. The central section of the cylinder contains an exhaust outlet 6 to which is connected an exhaust accumulator 15 in which exhaust steam establishes a back pressure of 35 lbs. p. s. i. abs. by means of a pressure regulator 16. Steam from the accumulator 15 is exhausted through an exhaust header 18. In some instances it is advantageous to supply oil from a lubricator to the steam header 10, as indicated at 19, where it will mix with the incoming steam.

A piston 13 of standard construction is reciprocally mounted within the cylinder 1 and is connected to a piston rod 14 which extends out of end 2. The outer end of the piston rod 14 is adapted for connection to the device to be motivated. In this case it is connected to the nozzle carriage 70 of the hydraulic log barker. The carriage 70 rides on tracks 73 and is held thereon by top rails 74. The carriage 70 supports a nozzle 71 from which water under pressure is directed to a rotating log. The water is supplied under pressure to the nozzle by a pivoted water feed pipe 72. Thus, upon reciprocation of the piston the nozzle is caused to travel back and forth over a path substantially thirty-one feet long. The logs to be barked are from twenty to twenty-seven feet long; hence there is created an end zone where no work is done by the nozzle. The reversal of travel and the acceleration to required velocity takes place in such end zones.

Figure 1:
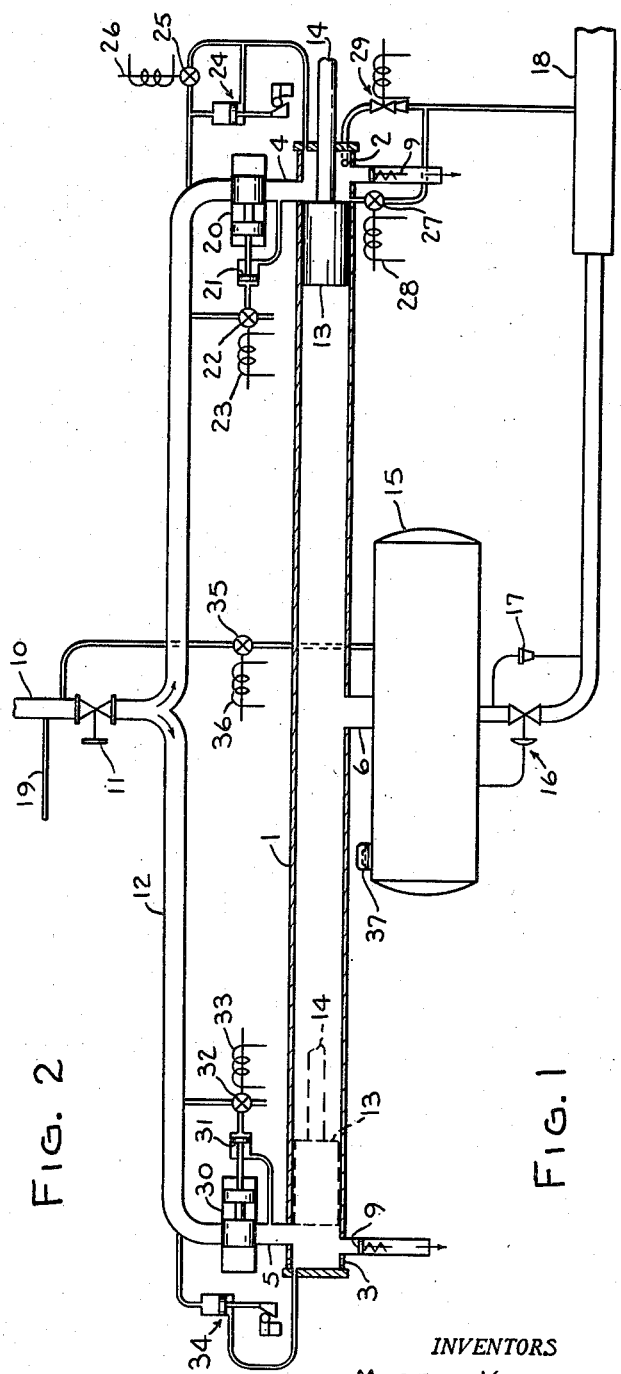
Fig. 1 is a diagrammatic view of a steam engine embodying the invention.

As previously generally stated, reversal of the travel of the piston is accomplished by the compression of steam under the force of the momentum of the piston rod and other moving parts connected thereto, such as the nozzle carriage 70 and nozzle 71. However, this momentum is initially caused by the acceleration of the piston by the admission of steam. It is thus apparent that the steam must be alternately admitted to each end of the cylinder and that the timing of the commencement and length of such admission must be controlled in order to maintain a substantially constant velocity of the piston throughout the major portion of its travel. To accomplish this there are positioned in the manifold 12, adjacent inlet ports 4 and 5, steam feed valves 20 and 30, respectively. The operation of the valves 20 and 30 is accomplished by respective pistons 21 and 31. The rod faces of the pistons 21 and 31 are continually connected to the cylinder ends and subject to the pressures therein. Such pressures unopposed move the valves 20 and 30 to the closed positions shown in Fig. 1. The plain faces of pistons 21 and 31 are connectible to the steam pressure in the manifold 12, or to atmosphere, through the control of respectively associated pilot valves 22 and 32. The pilot valves are operated by their respective solenoids 23 and 33. The operation of the solenoids 23 and 33 is in turn controlled in part respectively by pressure switches 24 and 34. The pressure switches 24 and 34 have their rod faces continually connected to their respective cylinder ends and their plain faces continually connected to the supply manifold 12. Thus, they operate on a differential of steam pressure within the cylinder ends and the supply line. When the pressure within a cylinder end increases above the supply pressure, the switches will move from the normally open position shown in Fig. 1 to the closed position.

Before the steam engine may be automatically operated, it is essential that it be warmed up to remove any condensate which might be trapped. In order to accomplish this there is provided preheat control valve 25 which connects the manifold 12 with the cylinder end 2 and permits the admission of steam to the head even though the steam feed valve 20 be closed. The valve 25 is controlled by a solenoid 26. There is also provided a preheat drain valve 27 which connects the cylinder end 2 with the header 18, thus permitting the exhausting of steam from such end to the exhaust header. This valve is controlled by a solenoid 28. Another valve 35 is placed in a line between the supply 10 and the accumulator 15 to permit steam to be directly passed to the accumulator. This valve is controlled by solenoid 36. When valves 25, 27 and 35 are open, steam passes from the supply line to the end 2 and the accumulator 15, heating them up to working temperatures and building up the required back pressure. A solenoid-operated valve 29 connects the cylinder end 2 to the exhaust header 18. The outlet for this valve is positioned about four inches in from the cylinder head to leave a space to provide a pressure cushioning chamber. This valve controls the stopping of automatic operation of the piston. All the solenoid-operated valves are of standard construction well known to those skilled in the art, see U. S. Patent No. 1,944,841, valves 22 and 32 being of the three-way type and valves 25, 27, 29, and 35 being of the straightway type. The accumulator 15 has mounted on it a safety cut-out pressure switch 37. This switch closes only when the pressure in the accumulator reaches 35 lbs. p. s. i. abs. and the engine cannot be put on automatic operation before this switch closes. Any condensate in the accumulator 15 will be driven out through trap 17 connected so as to by-pass the pressure regulator 16.

Figure 6:
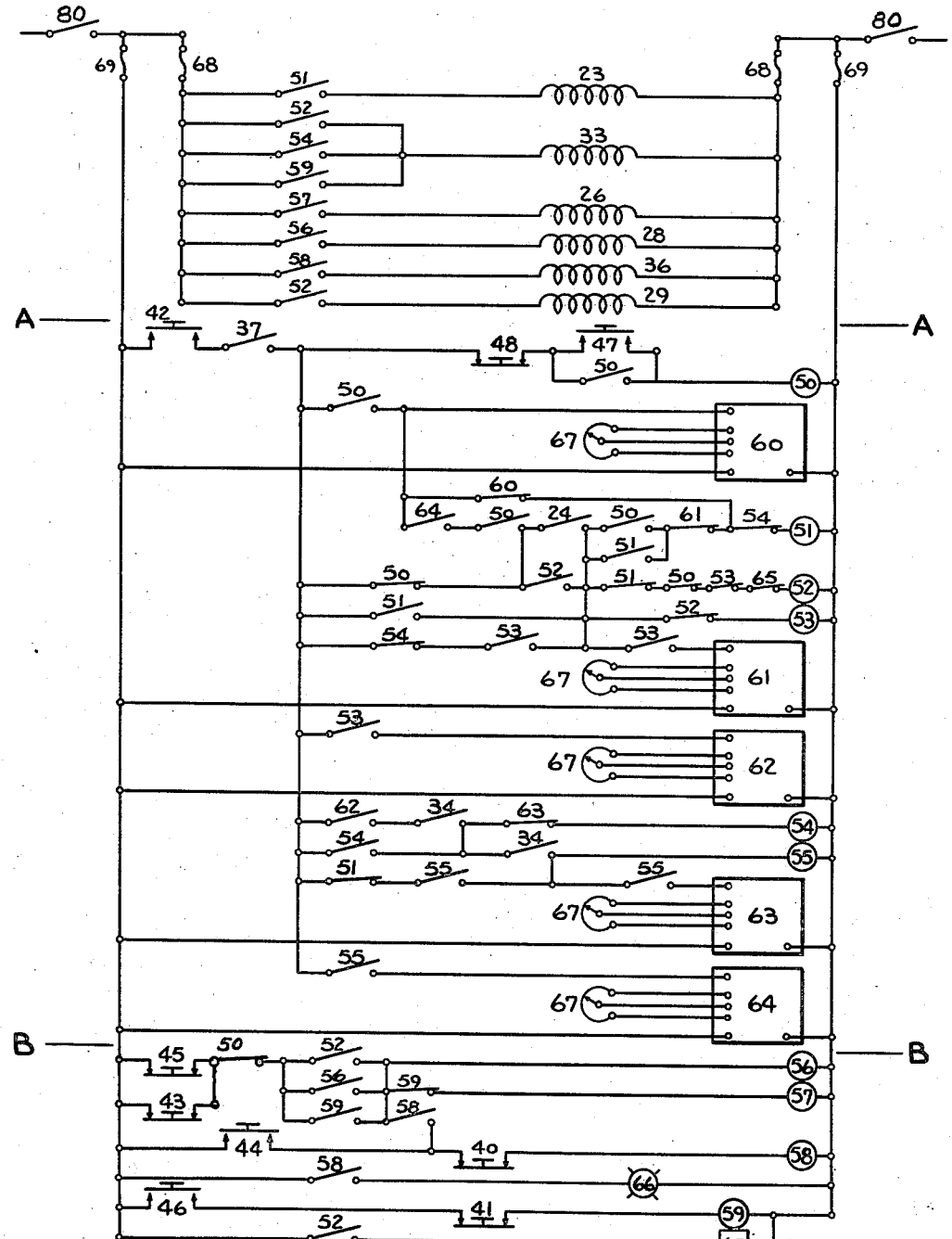
Fig. 6 is a schematic wiring diagram of the electronic timers, relays, solenoids, and switches forming the controls for the steam engine embodying this invention.

The timing of the operation of the various valves is accomplished by electronic timers 60, 61, 62, 63, and 64, shown by the squares in Fig. 6. These timers are of standard construction such as are described in Bulletin 7313–ET published by The Clark Controller Company of Cleveland, Ohio and shown in U. S. Patents Nos. 2,371,981 and 2,412,571. The timers are each provided with potentiometer rheostats 67 by which their timing operation may be controlled. There is also a magnetic flux timer 65 which is described in Bulletin 7313–ET published by The Clark Controller Company of Cleveland, Ohio. It provides a subsidiary control, as will be hereinafter set out in detail. Time delay relays of this type are well known and generally described in Standard Handbook for Electrical Engineers, 7th Ed. Sec. 5–149 to 168, incl. The automatic operation of the electrical switches for controlling the solenoids is under the control of relays of standard construction the coils and armatures of which are symbolically designated by the circles in Fig. 6 and numbered 50 to 59, inclusive. Relays 51 and 54 are provided with a mechanical interlock. The switches operated by the relays are identified by the same number as the coils and armatures of the relay and the switches operated by the timers are identified by the same number as the timer which operates them. In Fig. 6 the timers and relays and their respective switches are shown in the normal position prior to the commencement of automatic operation. There is also provision for non-automatic control of the various valves. A hand-operated lever having two positions, "Automatic" and "Hand," controls switches 40, 41, 42, and 43. When this lever is moved to "Hand," switches 40, 41 and 43 are closed and switch 42 is open, as shown in Fig. 6. When the lever is moved to "Automatic," switches 40, 41, and 43 are open and switch 42 is closed. The effect of this is two-fold. One effect is that selection of "Hand" prevents automatic operation, and vice versa, because switch 42 controls all the circuits between the lines A—A and B—B of Fig. 6, comprising the automatic operation circuits, and switches 40, 41, and 43 control all the circuits below the line B—B, comprising hand operation. The other effect is that the preheat operation cannot be stopped until the lever is moved to "Automatic," thus creating a sequence of operations preventing a delay between preheat and automatic operation which would permit the cooling off of the engine. This is accomplished by providing a push button switch 44 which is normally open and momentarily closed to start preheat operation and a push button switch 45 which is normally closed and momentarily opened to stop preheat operation, and by shunting switch 45 by switch 43. Thus, as long as the selector lever remains at "Hand" the preheat stop switch 45 is ineffective to break the circuit. It should be noted in the schematic diagram of Fig. 6 separate switches are shown for each sub-circuit; however, in actual practice, a single switch can control two or more sub-circuits. For example, the function of switches 40, 41, 42, and 43 may be performed by a single switch of double-throw type which in one position would close three circuits and open one circuit, and in the other position would close the one circuit and open the other three circuits. Once "Hand" has been selected it may be necessary to position the piston 13 at the cylinder end 2. This is controlled by push button switch 46 which is spring-pressed to off position (as shown) and held in closed position by the operator. After the selector lever has been moved to "Automatic," the starting of automatic operation is controlled by switch 47, a push-button type normally held in open position as shown. The operator need only hold it closed long enough to permit it to be shunted by the action of relay 50. The stopping of automatic operation is controlled by push button switch 48 normally urged to closed position as shown. Upon being momentarily opened by the operator it causes deenergization of relay 50 and automatic operation ceases.

Referring to Fig. 6, the power for the electrical controls is supplied through switch 80 from a source of alternating current of 110 volts. The solenoids for the valves are connectible to this supply through safety fuses 68 adapted to take sixty amperes. Current for the operation of the relays and electronic timers is supplied through fuses 69 adapted to stand thirty-five amperes. Each of the solenoids is connected across the line by relay switches operated by the respectively numbered relays. For example, switch 51 for solenoid 23 is operated by relay 51. Each of the electronic timers is also connected across the line by relay switches operated by relays bearing the same number. The timers operate the identically numbered switches. Throughout the wiring diagram of Fig. 6 the switches are shown in the normal position assumed upon the moving of the selector lever to "Hand." Relay switches 50, 51, 52, 53, 54, and 59 are of the double-throw type, that is when operated by the relay the open blades are closed and the closed blades are opened. Relay switches 55, 56, 57, and 58, timer switches 60 to 65, inclusive, pressure switches 24 and 34, and safety cut-out switch 37 are single throw type, those shown as closed opening upon operation and those shown as open closing upon operation of the respective relay, timer, or pressure responsive device. The functioning of the electrical system will be more fully described in and better understood from a description of the operation of the engine as hereinafter set forth.

The free piston steam engine herein described is designed to be operated from a source of steam supply at 125 lbs. p. s. i. abs. with a back pressure of 35 lbs. p. s. i. abs. Before the operation can be commenced, however, the cylinder must be warmed up almost to operating temperature. The purpose of this is to prevent the trapping of condensate between the piston and cylinder head which would cause severe damage. The first step, therefore, is to move the selector lever to "Hand." This closes switches 40, 41, and 43 and opens switch 42. The automatic circuits between A—A and B—B are now locked out and the "Hand" circuits are ready for energization. The next step is to momentarily close the preheat switch 44. This places relay 58 across the line. Relay switches 58 then place the solenoid 36, lamp 66, and relays 56 and 57 across the line and shunts out switch 44 by the closing of switch 56 so that switch 44 may return to normal. As a result of this, valves 25, 27, and 35 are opened and steam passes, as heretofore explained, from the supply line to the accumulator 15 and cylinder end 2 to the header 18 to bring these parts up to temperature. The indicating lamp 66 is lighted for the purpose of showing that the preheat operation is in process. The feed supply valves 20 and 30 are normally open when the main valve 11 is closed but after that valve is opened, and as soon as steam pressure starts to build up in the ends of the cylinder pressure is exerted on the rod faces of control pistons 21 and 31 which moves these pistons to the position shown in Fig. 1 closing both of the steam feed valves 20 and 30. Pressure builds up in the accumulator by reason of the operation of pressure regulator 16 to approximately 35 lbs. p. s. i. abs. Any condensate therein is drained off through steam trap 17. Excess steam is, of course, exhausted through the steam regulator 16. If the piston 13 has stopped between the exhaust port 6 and the cylinder end 2, the creation of pressure in the accumulator above atmospheric pressure will move it to the position shown in full lines in Fig. 1. If, on the other hand, the piston has stopped between the exhaust port 6 and the cylinder end 3, such as shown in the dotted line position in Fig. 1, then it is necessary to manually close and hold closed for a short time the positioner switch 46 which connects relay 59 across the line. Relay switches 59 place solenoid 33 and relay 56 across the line and disconnect relay 57. As a result of this, the feed supply valve 30 and drain valve 27 will open and valve 25 will remain closed or will close if open. Pressure from the supply line then moves the piston over to the exhaust port 6 from where it will move to the full line position at cylinder end 2. As soon as position switch 46 is released, valve 25 opens, feed valve 30 closes, and valve 27 remains open. This again puts the device under preheat operation.

When the engine is warmed up to substantially operating temperature, automatic operation may be commenced. However, such operation cannot be commenced unless pressure in the accumulator has reached 35 lbs. p. s. i. abs. and safety cut-out switch 37 of a pressure limit type is closed. Also, it should be noted that the preheat action cannot be stopped until the selector lever is moved to "Automatic" opening switches 40, 41, and 43, and closing switch 42. The circuits between A—A and B—B are now ready to be connected across the line. However, the circuits below B—B are still connected across the line by switch 45. The operator may then momentarily open switch 45 which is spring-biased to closed position. This deenergizes relays 56, 57, and 58, automatically closing valves 27, 25, and 35. However, if this is not done, the same result will be accomplished when automatic starting switch 47 is momentarily closed placing the relay 50 across the line. The relay switches 50 accomplish the following: shunt out switch 47 so it may return to normal position; place timer 60 and relay 51 across the line; place relay 51 under control of timer switch 64 and pressure switch 24; and lock out relays 52, 56, and 57. By mechanical interlock relay 54 is also locked out by the action of relay 51. The relay switches 51 accomplish the following: place solenoid 23 and relay 53 across the line; connect relay 51 across the line independent of relay switches 50; and lock out relay 52 and timer 63. Relay switches 53 accomplish the following: lock out relay 52; and connect timers 61 and 62 across the line. The results of these steps are: to open regulator valve 22 permitting steam from the source to enter against the plain face of piston 21 causing it to force feed valve 20 to the open position; and to commence the timing operation of timers 60, 61, and 62 so that upon the lapse of the preselected time each timer will operate its respective switch or switches. Steam at 125 lbs. p. s. i. abs. is then admitted against the piston rod face of piston 13 causing it to be accelerated toward the end 3. Steam is admitted from point A to point B indicated on the chart of Fig. 2, during which time the theoretical velocity of the piston has been accelerated from zero to substantially forty feet per second, and the piston has traveled substantially twelve feet. At this time, by reason of the lapse of the selected time limit, the timer 60 operates to open the switch 60 disconnecting relay 51; timer 61, being adjusted for a shorter period of time than timer 60, will have operated to open the switch 61. The relay switch 51 deenergizes solenoid 23, and regulator valve 22 cuts off the supply steam from the source and connects the plain face of piston 21 to atmosphere. This causes the valve 20 to close by reason of the pressure in the cylinder. Steam then in the cylinder is allowed to expand from the point B to the point C at which time the piston 13 uncovers the exhaust port 6 and the pressure drops at point D to the back pressure of 35 lbs. p. s. i. established in the accumulator. The piston 13, rod 14, and other parts moved thereby, have accelerated so that there is considerable force of momentum imparted thereto. This force compresses the steam between the piston 13 and the end 3 as it travels toward that end. The pressure increases along the line D, E, F. However, on such compression stroke, when the piston reaches the point E, the pressure in the cylinder exceeds the pressure in the supply line and the pressure switch 34 will be operated. At the time timer 60 cuts out relay 51, relay 54 by reason of the mechanical interlock is made ready for operation under the control of timer 62. Timer 62 is adjusted so that the time between it commences and the time it "fires" to operate its switch is slightly less than the time consumed for a normal full stroke and under normal speeds such timer will "fire" before the piston reaches the end of the stroke. Its firing or operation closes switch 62 to place relay 54 under control of pressure switch 34. However, if the speed of the piston is above normal, the timer 62 will delay "firing" and thus prevent the closing of the switch 62 and the consequent energization of relay 54, thus preventing the development of excessive speeds by preventing switch 54 from operating solenoid 33 and thus opening steam feed valve 30. When pressure switch 34 closes the circuit to relay 54, the relay switches 54 accomplish the following: place solenoid 33 and relay 55 across the line; disconnect relay 53 and timer 61; and keep relay 51 locked out. Relay switches 55 then place timers 63 and 64 across the line. The result of this is that solenoid 33 opens pilot valve 32 so that pressure from the supply line is supplied to the plain face of piston 31 and timers 63 and 64 start operation. This sets up conditions which will permit the piston 31 to open valve 30 when the pressure in the cylinder and on rod face of piston 31 drops to an amount a little above the steam line pressure. This pressure differential to accomplish operation is due to the smaller surface area on the rod side of piston 31. Opening will start to take place at approximately point G and the valve 30 will be fully open at approximately point H. At this point the steam will be admitted to the end 3 to compensate for the reduction of pressure following the expansion of the steam at the early stages of the return stroke. The velocity of the piston will be controlled by the length of time that steam is so admitted. In normal operation this time is indicated by the line H—I. The timer 63 is set so that it opens the circuit to relay 54 at point I. The deenergization of relay 54 cuts out solenoid 33 and unlocks relay 51 and timer 61. The results of this are valve 32 disconnects the plain face of piston 31 from the pressure of the supply line and connects it to atmosphere, closing valve 30. Just prior to the closing of valve 30 the pressure switch 34 moves to open position. The steam then expands from I to J until the piston 13 again uncovers the exhaust port 6 and the pressure in the cylinder is reduced to the back pressure of 35 lbs. p. s. i. indicated at K. Again, because of the force of momentum, the piston will continue its travel, compressing the steam between it and the end 2 along the line K L M. When point L is reached, the pressure switch 24 will close. The timer 64 is adjusted similarly to timer 62 and performs the same functions with respect to relay 51 as timer 62 performs for relay 54. When pressure switch 24 closes the circuit to relay 51, the relays perform as heretofore described and valve 22 connects the piston 21 with the pressure in the supply lines so that when pressure in the cylinder again drops to a point a little above the pressure in the supply line, the feed valve 20 will automatically start at point N to open and will be fully opened at point O. Steam will then be admitted from point O to point P. At this time, timer 61 will function to cut off relay 51 and close the valve 20 in the manner heretofore described. The sequence is then repeated as the piston reciprocates in the cylinder.

In order to stop automatic operation, the switch 48 is momentarily opened. This deenergizes relay 50 and the relay switches 50 cut timer 60 off the line and place relay 52 under the control of pressure switch 24 and timer 65. The next time pressure switch 24 is operated, relay 52 is connected across the line with the following results: pressure switch 24 is by-passed; solenoids 33 and 29, relays 56 and 57, and timer 65 are placed across the line; and relay 53 is disconnected. This causes valves 25, 27, 29, and 30 to open and stops operation of timer 62. The piston 13 is then caused to move to and stay at the full line position at head 2. The timer 65 will in a predetermined time operate to disconnect relay 52. This automatically causes the valves 29 and 30 to close but leaves the valves 25 and 27 open as in preheat operation. The engine is then in position to be again started on automatic operation, and during the interim its operating temperature is being maintained. If it is then desirous to permanently stop operation, the main switches 80 connecting the circuits with the power may be opened and all valves closed. The main supply valve may then be closed.

Although only one embodiment of the invention is shown and described herein, it will be understood that this application is intended to cover such changes or modifications as come within the spirit of the invention or scope of the following claims.

We claim:

1. A steam engine comprising a cylinder, a piston mounted for reciprocation in said cylinder, steam inlet ports at each end of said cylinder, an exhaust port for said cylinder intermediate said inlet ports, steam feed valves for controlling the admission of steam to said inlet ports, and means for closing one of said valves when the pressure in the end of said cylinder with which said one of said valves is connected exceeds the pressure of the source of supply.

2. A steam engine comprising a cylinder, a piston mounted for reciprocation in said cylinder, steam inlet ports at each end of said cylinder, an exhaust port for said cylinder intermediate said inlet ports, steam feed valves for controlling the admission of steam to said inlet ports, means by which the differential in steam pressure within a supply line and said cylinder operates said valves, solenoid-operated pilot valves for connecting said means to the pressure of steam in a supply line and for disconnecting said means from the supply line and connecting said means to atmosphere, and pressure-operated switches for controlling said solenoid-operated pilot valves.

3. A steam engine comprising a cylinder, a piston mounted for reciprocation in said cylinder, steam inlet ports at each end of said cylinder, an exhaust port for said cylinder intermediate said inlet ports, steam feed valves for controlling the admission of steam to said inlet ports, means by which the differential in steam pressure within a supply line and said cylinder operates said valves, solenoid-operated pilot valves for connecting said means to pressure of steam in a supply line and disconnecting said means from the supply line and connecting said means to atmosphere, pressure-operated switches for controlling said solenoid-operated pilot valves, and electronic timer means for controlling said solenoid-operated pilot valves.

4. A steam engine comprising a cylinder, steam inlet ports at each end of said cylinder, a source of steam under pressure connectible with said ports, an exhaust port in said cylinder intermediate said inlet ports, steam feed valves between said ports and said source to control the admission of steam thereto, pistons for operating said valves, one side of said pistons being connected to said cylinder to utilize the pressure developed therein to urge said valves toward closed position, the other side of said pistons being connected to solenoid-operated pilot valves, said pilot valves being operable to connect with said source or with atmosphere whereby atmospheric pressure or source pressure may be asserted against said other side, and a piston reciprocally operable in said cylinder.

5. A steam engine comprising a cylinder, steam inlet ports at each end of said cylinder, a source of steam under pressure connectible with said ports, an exhaust port in said cylinder intermediate said inlet ports, steam feed valves between said ports and said source to control the admission of steam thereto, pistons for operating said valves, one side of said pistons being connected to said cylinder to utilize the pressure developed therein to urge said valves toward closed position, the other side of said pistons being connected to solenoid-operated pilot valves, said pilot valves being operable to connect with said source or with atmosphere whereby atmospheric pressure or source pressure may be asserted against said other side, means for automatically controlling the operation of said solenoid-operated valves, and a piston reciprocally operable in said cylinder.

6. A steam engine comprising a cylinder, steam inlet ports at each end of said cylinder, a source of steam under pressure connectible with said ports, an exhaust port in said cylinder intermediate said inlet ports, steam feed valves between said ports and said source to control the admission of steam thereto, pistons for operating said valves, one side of said pistons being connected to said cylinder to utilize the pressure developed therein to urge said valves toward closed position, the other side of said pistons being connected to solenoid-operated pilot valves, said pilot valves being operable to connect with said source or with atmosphere whereby atmospheric pressure or source pressure may be asserted against said other side, pressure switches operable to closed position when pressure in either end of said cylinder exceeds the pressure of said source, said pressure switches when closed causing said other sides to be connected to said source, adjustable timing means operable to cause said other sides to be connected to atmosphere, and a piston reciprocally operable in said cylinder.

7. A steam engine comprising a cylinder, a piston reciprocally mounted in said cylinder, a piston rod secured to said piston and extending from one end of said cylinder, a source of steam under pressure, inlet valves adjacent each end of said cylinder for controlling the admission of steam from said source, said valves being operated by means having differential pressure faces, said means normally urging said valves toward closed position by pressure within said cylinder in excess of atmosphere or pressure generated by the reciprocal movement of said piston, an exhaust port for said cylinder intermediate said inlet valves, solenoid-operated pilot valves operable to connect said means to the pressure of said source to urge said inlet valves toward open position when the pressure in said cylinder applicable to said means drops to just above the pressure of said source, and electrical circuits for operating said solenoid-operated valves, said circuits being controlled by pressure switches operable as pressure in said cylinder exceeds pressure in said source and by adjustable electronic timers.

8. A steam engine comprising a cylinder, a free piston reciprocal therein, a source of steam under pressure, steam inlet ports at each end of the travel of said piston, an exhaust port intermediate said inlet ports, steam feed valves for controlling admission of steam to said cylinder, said valves being operated by means having differential pressure faces, said means normally urging said valves toward closed position by pressure in said cylinder in excess of atmosphere or pressure generated by the reciprocal movement of said piston, said means momentarily opening one of said valves to impart velocity to said piston, the force of momentum of said piston acting to compress steam between itself and the other end of said cylinder to stop said piston and reverse its direction, said means momentarily opening the other of said valves as the compression made pressure in said other end drops to approximately the pressure of said source of supply.

9. A steam engine comprising a cylinder, a free piston reciprocal therein, a source of steam under pressure, steam inlet ports at each end of the travel of said piston, an exhaust port intermediate said inlet ports, steam feed valves for controlling admission of steam to said cylinder, said valves being operated by means having differential pressure faces, said means normally urging said valves to closed position by pressure in said cylinder in excess of atmosphere or pressure generated by the reciprocal movement of said piston, said means momentarily opening one of said valves to impart velocity to said piston, the force of momentum of said piston acting to compress steam between itself and the other end of said cylinder to stop said piston and reverse its direction, said means momentarily opening the other of said valves as the compression made pressure in said other end drops to approximately the pressure of said source of supply, and means for adjusting the duration of the opening of said valves.

10. A steam engine having manually controlled operation and automatic operation comprising a cylinder, a piston reciprocal therein, a source of steam under pressure, steam inlet ports at each end of said cylinder spaced from the respective heads thereof, an exhaust port intermediate said inlet ports, steam feed valves for controlling the admission of steam from said source to said ports during automatic operation of said engine, an exhaust accumulator connected with said exhaust port, a valve for controlling the admission of steam from said source to said accumulator, a valve for controlling the admission of steam from said source to one end of said cylinder through a respective head thereof, and a valve for controlling the draining of steam from said end at a place spaced from the head thereof substantially the same distance as said inlet ports, said three last named valves being operable independently of said steam feed valves during manually controlled operations.

11. A steam engine having manually controlled operation and automatic operation comprising a cylinder, a piston reciprocal therein, a source of steam under pressure, steam inlet ports at each end of said cylinder spaced from the respective heads thereof, an exhaust port intermediate said inlet ports, steam feed valves for controlling the admission of steam from said source to said ports during automatic operation of said engine, an exhaust accumulator connected with said exhaust port, a valve for controlling the admission of steam from said source to said accumulator, a valve for controlling the admission of steam from said source to one end of said cylinder through a respective head thereof, a valve for controlling the draining of steam from said end at a place spaced from the head thereof substantially the same distance as said inlet ports, and a valve for releasing steam from said end at a place spaced between said first mentioned place and said respective head, said four last named valves being operable independently of said steam feed valves during manually controlled operations.

12. A steam engine having manually controlled operation and automatic operation comprising a cylinder, a piston reciprocal therein, a source of steam under pressure, steam inlet ports at each end of said cylinder spaced from the respective heads thereof, an exhaust port intermediate said inlet ports, steam feed valves for controlling the admission of steam from said source to said ports during automatic operation of said engine, an exhaust accumulator connected with said exhaust port, a valve for controlling the admission of steam from said source to said accumulator, a valve for controlling the admission of steam from said source to one end of said cylinder through a respective head thereof, a valve for controlling the draining of steam from said end at a place spaced from the head thereof substantially the same distance as said inlet ports, said three last named valves being operable independently of said steam feed valves during manually controlled operations, and means for interrelating the automatic operation of said steam feed valves and the manually controlled operation of said other valves so that said engine must be preheated prior to the commencement of automatic operation.

13. A steam engine having manually controlled operation and automatic operation comprising a cylinder, a piston reciprocal therein, a source of steam under pressure, steam inlet ports at each end of said cylinder spaced from the respective heads thereof, an exhaust port intermediate said inlet ports, steam feed valves for controlling the admission of steam from said source to said ports during automatic operation of said engine, an exhaust accumulator connected with said exhaust port, a valve for controlling the admission of steam from said source to said accumulator, a valve for controlling the admission of steam from said source to one end of said cylinder through a respective head thereof, a valve for controlling the draining of steam from said end at a place spaced from the head thereof substantially the same distance as said inlet ports, a valve for releasing steam from said end at a place spaced between said first mentioned place and said respective head, said three last named valves being operable independently of said steam feed valves during manually controlled operations, and means for interrelating the action of said valve for releasing steam with said other valves to stop automatic operation.

14. An engine comprising a cylinder, a piston mounted for reciprocation in said cylinder, inlet ports at each end of said cylinder, an exhaust port for said cylinder intermediate said inlet ports, feed valves for controlling the admission of a compressible medium to said inlet ports, and means for closing one of said valves when the pressure in the end of said cylinder with which said one of said valves is connected exceeds the pressure of the source of supply.

15. An engine comprising a cylinder, a piston mounted for reciprocation in said cylinder, inlet ports at each end of said cylinder, an exhaust port for said cylinder intermediate said inlet ports, feed valves for controlling the admission of a compressible medium to said inlet ports, means by which the differential in pressure within a supply line and said cylinder operates said valves, solenoid-operated pilot valves for connecting said means to the pressure of compressible medium in a supply line and for disconnecting said means from the supply line and connecting said means to atmosphere, and pressure-operated switches for controlling said solenoid-operated pilot valves.

16. An engine comprising a cylinder, a piston mounted for reciprocation in said cylinder, inlet ports at each end of said cylinder, an exhaust port for said cylinder intermediate said inlet ports, feed valves for controlling the admission of a compressible medium to said inlet ports, means by which the differential in pressure within a supply line and said cylinder operates said valves, solenoid-operated pilot valves for connecting said means to pressure of the compressible medium in a supply line and disconnecting said means from the supply line and connecting said means to atmosphere, pressure-operated switches for controlling said solenoid-operated pilot valves, and electronic timer means for controlling said solenoid-operated pilot valves.

17. An engine comprising a cylinder, a piston reciprocal therein, a source of compressible medium under substantially constant pressure, an inlet port at one end of the travel of said piston, an exhaust port intermediate said inlet port and the other end of the travel of said piston, a feed valve for controlling the admission of medium to said inlet port, and means for closing said valve when the pressure in said end of said cylinder exceeds the pressure of said source.

18. An engine comprising a cylinder, a piston reciprocal therein, a source of compressible medium under substantially constant pressure, an inlet port at one end of the travel of said piston, an exhaust port intermediate said inlet port and the other end of the travel of said piston, a feed valve for controlling the admission of medium to said inlet port, means for operating said valve under control of the difference in pressure in said cylinder and in said source, and timing means for also controlling the operation of said valve.

MARTIN KAHR.
VINCENT R. NOLL.

REFERENCES CITED

The following references are of record in the file of this patent:

UNITED STATES PATENTS

| Number | Name | Date |
|---|---|---|
| 589,355 | Knight | Aug. 31, 1897 |
| 1,527,678 | Farquhar | Feb. 24, 1925 |
| 2,260,127 | Tebbetts | Oct. 21, 1941 |